(12) United States Patent
Isaacson et al.

(10) Patent No.: US 12,198,194 B1
(45) Date of Patent: Jan. 14, 2025

(54) MESSAGE RANDOMIZATION AND DELAY BASED ON ORDER TYPE IN AN ELECTRONIC TRADING SYSTEM

(71) Applicant: Cboe Exchange, Inc., Chicago, IL (US)

(72) Inventors: Christopher Andrew Isaacson, Olathe, KS (US); Eric Crampton, Overland Park, KS (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/636,448

(22) Filed: Apr. 16, 2024

Related U.S. Application Data

(62) Division of application No. 17/162,818, filed on Jan. 29, 2021, now Pat. No. 11,995,719.

(60) Provisional application No. 63/080,994, filed on Sep. 21, 2020.

(51) Int. Cl.
*G06Q 40/04* (2012.01)
*G06F 9/46* (2006.01)
*G06F 9/54* (2006.01)

(52) U.S. Cl.
CPC ............. *G06Q 40/04* (2013.01); *G06F 9/466* (2013.01); *G06F 9/546* (2013.01)

(58) Field of Classification Search
CPC .......... G06Q 40/04; G06F 9/466; G06F 9/546
See application file for complete search history.

(56) References Cited

U.S. PATENT DOCUMENTS

| | | | |
|---|---|---|---|
| 4,412,287 A | 10/1983 | Braddock, III | |
| 6,618,707 B1 | 9/2003 | Gary | |
| 7,158,951 B2 | 1/2007 | Stark | |
| 7,379,909 B1 | 5/2008 | Cruz et al. | |
| 7,483,854 B2 | 1/2009 | Liu | |
| 7,644,027 B2 | 1/2010 | Keith | |
| 7,685,044 B1 | 3/2010 | Robertson et al. | |
| 7,921,054 B2 | 4/2011 | Balabon | |
| 8,055,574 B2 | 11/2011 | Cutler et al. | |
| 8,165,954 B2 | 4/2012 | Waelbroeck et al. | |
| 8,527,391 B2 | 9/2013 | Siverson et al. | |
| 8,630,934 B2 | 1/2014 | Altius | |
| 8,639,902 B2 | 1/2014 | Jeddeloh | |
| 8,706,608 B2 | 4/2014 | Bok et al. | |
| 8,751,363 B2 | 6/2014 | Cushing et al. | |
| 9,881,338 B2 | 1/2018 | Schmitt et al. | |

(Continued)

FOREIGN PATENT DOCUMENTS

WO  WO-2016018453 A1 * 2/2016 ............. G06Q 40/04
WO  WO 2018/048999 A1    3/2018

OTHER PUBLICATIONS

U.S. Appl. No. 17/162,959, filed Jan. 29, 2021.

(Continued)

*Primary Examiner* — Elda G Milef
(74) *Attorney, Agent, or Firm* — Crowell & Moring LLP

(57) ABSTRACT

A system and method for managing latency of messages in an exchange system to address technical advantages in certain market participant hardware are disclosed. In one implementation, the system may include an exchange system, and a set of instructions, to cause a processor of the exchange system identify an order type susceptible to technical advantages certain market participants may possess and to apply a re-ordering of, and/or a fixed or random latency to, all orders of the identified order type during a predetermined time of a trading day.

20 Claims, 8 Drawing Sheets

(56) References Cited

U.S. PATENT DOCUMENTS

| | | |
|---|---|---|
| 10,002,385 B2 | 6/2018 | Renton et al. |
| 10,127,612 B2 | 11/2018 | Mannix |
| 10,127,615 B1 | 11/2018 | Givot |
| 10,163,157 B2 | 12/2018 | Crowley |
| 10,185,993 B2 | 1/2019 | Katsuyama et al. |
| 10,303,530 B1 | 5/2019 | Givot et al. |
| 10,325,317 B2 | 6/2019 | Melton |
| 10,346,910 B2 | 7/2019 | Katsuyama et al. |
| 10,346,918 B2 | 7/2019 | Schmitt et al. |
| 10,462,024 B1 | 10/2019 | Kavanagh et al. |
| 2002/0156719 A1 | 10/2002 | Finebaum et al. |
| 2005/0102220 A1 | 5/2005 | Stackpole |
| 2012/0054084 A1* | 3/2012 | Wolf .................. G06F 3/00 705/37 |
| 2012/0271745 A1 | 10/2012 | Buck |
| 2015/0066727 A1 | 3/2015 | Wepsic et al. |
| 2015/0073967 A1 | 3/2015 | Katsuyama et al. |
| 2016/0035027 A1 | 2/2016 | Mercer et al. |
| 2016/0063621 A1* | 3/2016 | Dengis .................. G06Q 40/04 705/37 |
| 2016/0328797 A1* | 11/2016 | Figy .................. G06Q 40/04 |
| 2018/0060146 A1 | 3/2018 | Millhuff et al. |
| 2018/0191624 A1 | 7/2018 | Haynold |

OTHER PUBLICATIONS

Subramoni, H. et al. "Streaming, low-latency communication in on-line trading systems", 2010 IEEE International Symposium on Parallel & Distributed Processing, Workshops and PhD Forum (IPDPSW), Atlanta, GA, US, 2010, pp. 1-8, doi: 10.1109/IPDPSW.2010.5470717.

Byrd, David et al., "The Importance of Low Latency to Order Book Imbalance Trading Strategies", Jun. 15, 2020, 7p, US.

\* cited by examiner

MESSAGE RANDOMIZATION AND DELAY BASED ON ORDER TYPE IN AN ELECTRONIC TRADING SYSTEM

CROSS-REFERENCE TO RELATED APPLICATIONS

This application is a divisional of U.S. patent application Ser. No. 17/162,818, filed on Jan. 29, 2021, which claims the benefit of U.S. Provisional No. 63/080,994, filed Sep. 21, 2020, which are hereby incorporated by reference in their entirety.

FIELD OF THE DISCLOSURE

The present disclosure relates to the trading of financial products. More specifically, the present disclosure relates to aspects of automatically adjusting system response times in a financial trading system.

BACKGROUND

A derivative is a financial security whose value is based, at least in part, on a value or characteristic of an underlying asset. Two exemplary and well-known derivatives are options and futures.

An option is a contract that gives the contract holder a right, but not an obligation, to buy or sell an underlying asset at a specific price on or before a certain date. Generally, a party who purchases an option is referred to as the holder of the option and a party who sells an option is referred to as the writer of the option.

There are generally two types of options: call and put options. A holder of a call option receives a right to purchase an underlying asset at a specific price, i.e., the "strike price." If the holder exercises the call option, the writer is obligated to deliver the underlying asset to the holder at the strike price. Alternatively, the holder of a put option receives a right to sell an underlying asset at a strike price. If the holder exercises the put option, the writer is obligated to purchase the underlying asset at the agreed upon strike price. When settlement includes the transfer of an underlying asset, the settlement is often referred to as physical settlement or in kind settlement. However, an underlying asset of an option need not be tangible and/or transferable property.

Options may also be based on more abstract market indicators, such as stock indices, interest rates, futures contracts, and other derivatives. In these cases, physical settlement may not be desired and/or possible. When physical settlement is not desired and/or preferred, contracts may be "cash settled." That is, rather than transferring the underlying asset, a cash payment is made to settle the contract. For example, using cash settlement, a holder of an index call option receives the right to "purchase" not the index itself, but rather a cash amount based on the value of the index multiplied by a multiplier, e.g., $100. For example, if a holder of an index call option exercises the option, the writer of the option must pay the holder the difference between the current value of the underlying index and the strike price multiplied by the multiplier.

Similar to options contracts, futures contracts may also be based on abstract market indicators. Futures contracts give a buyer of the future an obligation to receive delivery of an underlying commodity or asset on a fixed date in the future. Accordingly, a seller of the future contract is obligated to deliver the commodity or asset on the specified date for a given price.

Although futures contracts generally confer an obligation to physically deliver an underlying asset on a specified delivery date, the actual underlying asset need not change hands. Instead, futures contracts, like options contracts, may be cash settled. To cash settle a futures contract, the difference between a market price and a contract price of an underlying asset is paid by one investor to the other. Again, like options, cash settlement allows futures contracts to be created based on more abstract assets, such as market indices. To cash settle index futures, the difference between the contract price and the price of the underlying index (i.e., current value of market index) is exchanged between the investors. Derivatives such as options and futures may be traded over-the-counter ("OTC"), and/or on other trading facilities such as organized exchanges (e.g., Chicago Board Options Exchange Incorporated (CBOE)). OTC transactions are bilateral in nature and individual parties to a transaction are free to customize each transaction as they see fit. Platform-traded derivatives, such as exchange traded derivatives, are standardized and are settled using a clearing corporation that acts as an intermediary when a contract is exercised.

Electronic trading systems that handle and process quotes an orders for derivatives are utilized by different types of market participants, for example, traders and market-makers. Traders are investors or professionals who make purchases and sales. Market-makers are exchange members who provide liquidity in the marketplace by risking their own capital in making bids and offers for their own accounts in the absence of public buy or sell orders.

An electronic exchange typically processes many types of order types for the financial products offered. Well known order types include, market orders (price not specified, but trade to take place at best price available at time of order), limit orders (limit order to buy is set below the current price while limit order to sell is placed above the current price), stop orders and so on. Certain order types can leave the party who places the order vulnerable to technical advantages some traders may have over the trader who placed an earlier order. For example, traders with access to or expertise with higher speed technology may be able to trade faster against an earlier order placed by a trader lacking those technical advantages who then does not have time to modify or withdraw the earlier order when market conditions change. It would be advantageous to reduce technology-based disparities between traders for order types that expose traders to trading speed issues, therefore also reducing potentially predatory trading behavior that could be enabled by technology-based trading speed disparities.

SUMMARY

Methods and systems for automatically imposing a randomly initiated delay on order handling and/or reordering the orders for all orders of a particular order type during a predefined portion of a trading day at an electronic exchange.

According to one aspect, a computer-implemented method adjusting order queue priority in an electronic exchange system is provided. The method may be executed with a processor of the electronic exchange system. The method may include receiving an order from a market participant at the processor and identifying which order type of a plurality of order types is associated with the received order. When the order type is identified as a trade at settlement (TAS) order, then the processor may determine if that TAS order has been received during a designated time period for order randomization. Only when the TAS order has been received during the designated time period, the processor may delay acknowledgement of the received TAS order to the market participant that sent the order, and continue to receive and delay acknowledgement of additional TAS orders until an end of the designated time period has been reached. At the end of the designated time period, the processor may then re-order a time priority of the TAS orders received during the designated time period and transmit an acknowledgment message for each of the TAS orders received during the designated reflecting the re-ordered time priority. The re-ordering of priority of the orders received may be based on the order type, the market participant identifier, or other information included in the order message. The re-ordering may be a fixed randomization process based on a predetermined re-ordering technique. Alternatively, the re-ordering may be randomized based on the use of a random number generator or a random selection of a re-ordering technique from a database of different predetermined re-ordering techniques.

According to another aspect, an electronic exchange system for managing re-ordering or latency of messages from market participants is described. The exchange system may include a communication interface configured to identify an order type associated with order messages from the market participants and a processor in communication with the communication interface. A memory in communication with the processor may be included that contains processor-executable instructions to cause the processor to receive an order from a market participant and identify which order type of a plurality of order types is associated with the received order. When the order type is identified as a trade at settlement (TAS) order, the processor executable instructions may cause the processor to determine if a time for determining a TAS order latency has been reached and, only when the time for determining the TAS order latency has been reached, to then retrieve predetermined parameters for calculating a latency duration and start time for applying the TAS order latency to the TAS order. The processor may then be configured to, in response to reaching the calculated start time, add a latency to the received TAS order for the calculated latency duration and apply the calculated latency duration to each subsequently received TAS order until a settlement time for the electronic trade system has been reached. The processor-executable instructions may alternatively, or in combination with the latency, apply a re-ordering of the priority of the received TAS orders during a designated period of time and only acknowledge the received orders in acknowledgement messages that reflect the re-ordering at the end of the designated period.

DETAILED DESCRIPTION

Figure 1:
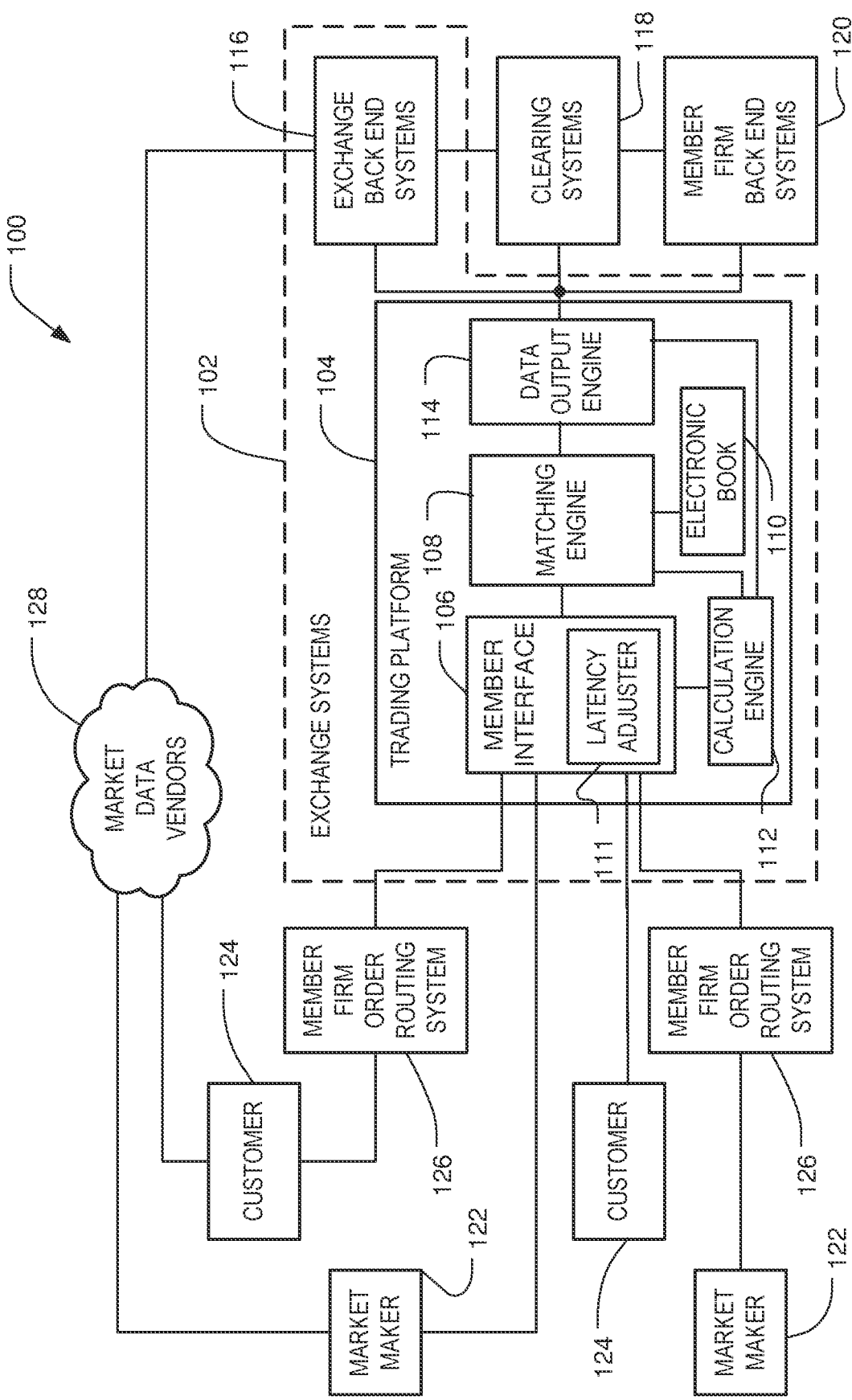
FIG. 1 is a block diagram of an exemplary financial trading system that may be used to implement an embodiment of the present invention.

The present disclosure is directed to methods and systems related to the control of order flow for certain order types in an electronic trading system that can allow market participants with faster communication capabilities a technical advantage over other market participants.

One example order type that may leave market participants vulnerable to market participants with higher speed communication technology and expertise is a trade-at-settlement (hereinafter TAS) order. Market participants may be able to enter certain securities (e.g. futures) orders in a TAS order book during the trading day at a price equal to that day's settlement price (the price reached based on the market close price after calculations made during a subsequent settlement period following the market close for that trading day), or at a specified differential above or below the daily settlement price, e.g., two minimum price increments higher (+2) or lower (−2) than the daily settlement price. Completed TAS transactions may be confirmed during the trading session, and the final price of the transaction may be confirmed when the daily settlement price is established.

The settlement price for TAS positions are a function of the closing price, typically being priced at ranges between −10 and +10 ticks (minimum exchange supported price increments) of it. The TAS position is typically profitable if the offsetting futures contracts used to close are less than the settlement price (plus the TAS differential). The converse it typically true for a loss.

A market participant can cancel an order if it has not executed yet. There is a TAS order book where the prices are the settlement price plus any defined number of tick increments above or below the settlement price a market participant is willing to trade at. Once an order has been matched, the market participant is either long or short the TAS contract and has to trade out of it if the market participant does not actually want to do the futures trade at the close, in the same manner as if the market participant had a position in a futures contract and wanted to get flat (counter-orders for all positions, getting a market participant completely out of the market) before the delivery process starts.

While TAS transactions on an electronic trading system may be intended to help traders even out end-of-day price exposure for particular types of futures contracts or other financial instruments, technological advantages in timing and speed of communication can actually cause problems for market participants who lack the fastest connections or expertise.

For example, for those who use the TAS order type, traders with technological advantages and expertise may attempt to take advantage or avoid order flow messages in an electronic exchange by employing a speed advantage to optimize quoting, including canceling limit orders ahead of incoming market orders. The market participant (such as a trader or its client), seeing the flat price overly bid and not wanting to take a chance on a worse price, takes the TAS+1 (one "tick" (minimum price increment) worse), and in the interim the traders with technological advantages and expertise cancel large numbers of orders just before the settlement. So, the trader/client gets a worse price as a result.

As disclosed herein, a system and method for monitoring types of orders and time of the trading day are disclosed, where randomized order entry windows for trade at settlement orders are applied, and a fixed or random delay is added to TAS orders in the randomized window to help prevent the type of issues noted above. The time of the trading day is automatically monitored, and TAS orders received, regardless of source, after the TAS window has opened are automatically identified and processing delays are automatically generated, and/or TAS order reordering is initiated. The system and method thus permits application of fixed/randomized delays and/or reordering at some times of the day and not at others. For example: at the time of TAS order queuing: no delay may be added, but the order of TAS orders in the queue may be randomized during the queuing window; while during regular trading of TAS contracts: no randomization of TAS orders, but a speedbump of, for example 50 microseconds, may be applied to TAS orders.

In one embodiment, the TAS order type may be identified by the electronic trading platform by referencing an order message header and comparing the header data to an order type parameter database. Also, an order type may include a specified time of day order window or windows recognizable by an electronic trading platform of the exchange. In different embodiments, the exchange system may randomly open the trading window for a particular order type, such as the TAS order type, and may automatically apply a randomization of any TAS orders arriving in that fixed, or randomly initiated, TAS order window. In another embodiment, the order window for TAS orders may be set at a fixed time of the trading day, but the delay added to the TAS orders received during that fixed start time window may be randomly applied to each order within a predetermined range of message delay times.

As described in greater detail below, various system components in the electronic trading system may be configured to store quotes and orders, monitor the time of the trading day, implement the randomized re-arrangement of orders received at the start of the TAS order window. In different embodiments, the system components may additionally or alternatively apply a fixed or random delay to order messages identified as related to TAS orders.

According to one embodiment of the present invention, the methods and systems described herein are integrated into a computerized financial trading system, such as computerized systems that are currently used by financial exchanges (e.g., Cboe Futures Exchange). According to other embodiments of the present invention, the methods and systems described herein can be implemented utilizing computerized financial systems that are separate from systems that are currently used by financial exchanges or by utilizing a combination of financial exchange and non-financial exchange systems.

The various quote monitoring and timing modification features discussed above and herein may be implemented in a computer platform of the exchange system, alternatively referred to as a financial trading system. FIG. 1 shows a simplified block diagram that illustrates such a financial trading system 100. Each of the blocks of FIG. 1 can be implemented using a combination of computer hardware and software designed and implemented to achieve the functionality of each of the blocks. For example, member interface 106, as described in further detail below, may include special purpose software configured to accept financial exchange messages including constituent series orders/quotes from market participants through a communication port of a computer server connected to an electronic communication network (e.g., LAN or Internet) by one or more pieces of computer networking equipment (e.g., a switch) configured through software to receive and route the financial exchange messages to the appropriate destinations within the financial trading system 100.

The financial trading system 100 may include financial exchange components, as well as components that may be operated by non-exchange entities that access the financial exchange. Examples of financial exchange components are shown within the dashed lines 102. Components outside the dashed lines 102 are components that may be operated by non-exchange entities. Electronic communications within financial trading system 100 may be achieved using a variety of known mediums, including: local area networks (LANs), wide area networks (WANs), the Internet, etc.

The illustrated exchange components of the financial trading system 100 may include a computer implemented trading platform 104 (that includes, but is not limited to, a member interface 106, one or more matching engines 108, an electronic book 110 (which may be embedded within the matching engines 108), and a data output engine 114) and computer implemented exchange backend systems 116. Member interface 106 may provide an electronic interface for receiving trading messages (e.g., bids, offers, quotes, orders, and trading instructions for constituent series or other financial instruments) from one or more computing devices associated with one or more market participants including traders or other entities transacting business at the financial exchange. Member interface 106 may be implemented as a graphical user interface (GUI) or Application Programming Interface (API) and may include one or more software components operating on a computing device configured to perform trading functionality.

Member interface 106 may also be implemented to analyze electronic trading messages for proper format and information. If member interface 106 (or another financial exchange component) deems a trading message to have proper format and information, member interface 106 may route the eligible electronic trading messages to the appropriate matching engine 108 that manages the associated electronic book 110 where the result may be an order/quote entered into the respective book or an immediate match between a buyer and seller.

Additionally, the member interface 106 may include a latency adjuster 111 that implements changes to the queueing order and/or latency, for example quote and order messaging delays (may also be referred to herein as speedbumps), on an order type basis. The latency adjuster 111 may act to take TAS orders input into the exchange systems 102 during a TAS queuing period before the opening of a trading day and to rearrange the order of receipt of those TAS orders from the actual order of receipt. The latency adjuster 111 may also, or alternatively, operate to implement or remove latency to any market participants orders directed to a specific order type, such as the TAS order type. The latency adjuster 111 may be configured to monitor the time of the trading day and whether a randomized (or fixed) window of time for receiving a particular order type is active. Orders for the particular type of order that are placed in the active order window are either placed on the book with a delay identifier, or may be delayed before placement on the book, before the order is executed. The latency adjuster 111 may include an interface that automatically transmits notices to market participants when a delay is about to be applied to order messaging for the identified order type. In different implementations, the latency adjuster 111 may periodically or continuously post or transmit latency data affecting any actively delayed order type for all market makers to see, or just to those who have entered orders and that have been affected.

The latency adjuster 111 is shown as part of the member interface 106 in the trading platform 104 in FIG. 1, but may be located in the matching engine 108 or be separate from either the member interface 106 or the matching engine 108 in other implementations. The latency adjuster 111 may include a buffer that briefly stores, and shuffles the order of, received TAS orders in near real-time during a TAS order queueing period. The latency adjuster 111 may be configured as a physical circuit with switchable delay paths, or utilize a software-implemented re-ordering of queue priority and/or delay on a processor, to implement randomized TAS order queue re-ordering and/or switchable delay paths based on order type in different implementations. The latency adjuster may receive orders of a particular order type during a predetermined or random time period, reorder the order in the order queue for that particular order type from the actual time of receipt, and then only send out confirmations of order receipt identifying the reordered time/priority order. The latency adjuster 111 may identify time of trading day and order type to apply a blanket delay (speedbump) to order processing for that order type at a given time of the trading day. Alternatively, the latency adjuster may selectively adjust specific market-maker, or specific other market participant, messages (including quote and order messages) based on order type identifier, time of trading day and any of a number of identification criteria, including user ID numbers, IP address information, or other market-maker specific identification or communication path information associated with a given quote or other order message arriving at the exchange systems 102. Other details about the functionality of the latency adjuster 111 in the trading system 100 are discussed in more detail below.

The trading platform 104 may include an application programming interface (API), which enables external systems to communicate with the member interface 106 and/or other components of exchange systems 102. The API may include programming instructions and standards that allow one or more market participants (e.g., market maker 122, customer 124, member firm order routing system 126, etc.) to interface with the trading platform 104 via specially programmed computer code. For example, market maker 122 may program software to connect to an API at trading platform 104. Once connected, market maker 122 may enter orders/quotes into a specially programmed computer or have programs generate computer orders/quotes based on determined strategies. The entered or otherwise generated orders/quotes can be sent to the trading platform 104 via the API. Once received, the API can route the received orders/quotes to a processor associated with member interface 106 where a determination can be made as to whether the orders/quotes are eligible for entering into the electronic book 110 and/or execution. Eligible orders/quotes can be sent to the electronic book 110 and/or matching engine 108. Due to the large number of trading messages that are received every second, the API and/or member interface 106 should be configured to quickly and accurately process large amounts of data in short amounts of time.

In some embodiments, trading messages received via member interface 106 may be communicated to matching engine 108, which in turn may result in data being sent to external systems such as clearing systems 118 or member firm backend systems 120 via data feeds. In embodiments, data in data feeds may be categorized or otherwise grouped based on one or more attributes that are associated with a financial product. The attributes may include, for example, a product symbol, an opening price, a strike price, an expiration date, a quote, originator of the order or quote, a class, a bid, an ask, or any number of other attributes that can be used to group trading message data. Data having one or more similar attributes may be combined to form an input set. The formation of an input set, attribute grouping, or other categorization of data in the data feed may be performed by a processor at the data output engine 114 of the trading platform 104. The input sets may include all or part of the data in one or more trading messages in data feeds.

Matching engine 108 may provide an electronic mechanism for matching bids and offers that are submitted to the financial exchange by traders or other entities transacting business at the financial exchange. While financial trading system 100 shows a single matching engine 108, multiple matching engines may be included in a trading platform 104. Multiple matching engines may work independently or cooperatively depending on various factors related to the business of the financial exchange. For example, different exchange traded products (e.g., stocks, options, futures, etc.) may utilize different matching engines. The matching engine 108 may execute trades by pairing buy and sell orders. In some examples, non-marketable orders may be placed in an electronic book 110. Orders or quotes in electronic book (also referred to as the EBOOK) 110 may rest until they can be matched to a contra order or quote.

Matching engine 108 may update the electronic book 110 based on executed transactions. After a trade is executed, matching engine 108 may send information related to the executed trade to the data output engine 114. The data output engine 114 may send the received information to exchange backend systems 116, which may be used in the process of settling trades that have been executed at the financial exchange. Further, data output engine 114 may send information related to the executed trade to member firm backend systems 120. Member firm backend systems 120 may record or otherwise track an entity's executed transactions and/or those transactions that have yet to be executed.

The non-exchange components of financial trading system 100 can include clearing systems 118, member firm backend systems 120, and member firm order routing system 126; however, additional non-exchange components are also contemplated. Clearing systems 118 may be used in the process of clearing and settling trades that have been executed at the financial exchange. An example of a clearing corporation is The Options Clearing Corporation, which is a derivatives clearing organization. In some examples, the data output engine 114 may send a calculated value to the clearing systems 118 for use in settling one or more transactions. Member firm backend systems 120 may be used by the entities conducting business at the financial exchange to receive settlement information regarding their transactions. The received settlement information, which may include the value used in the settlement process, may be transmitted from exchange system 102 (e.g., data output engine 114) to member firm backend systems 120 via a communication mechanism. In embodiments, member firm backend systems 120 may include a storage device for storing the settlement information, a display device for displaying the settlement information, and/or any number of other components that can be used to facilitate the use of the settlement information.

The computer implemented trading platform 104 can be accessed in a variety of ways by entities conducting business at the financial exchange. For example, market makers may access computer implemented trading platform 104 through market maker computers 122 that are in electronic communication with the member interface 106 (or an API). Utilizing the market maker computers 122, electronic trading messages (e.g., bids, offers, quotes, orders, trading instructions) may be sent to the computer implemented trading platform 104. Alternatively, the electronic trading messages may be routed through a member firm order routing system 126. The trading messages may include instructions for trading simple and/or complex orders. A simple order may include a single leg, while a complex order may include multiple legs that may be completed for a net price. One or more of the legs in the order may be for an index with a value that is determined using calculation engine 112 as described herein.

In further embodiments, a non-member entity wanting to transact business at the financial exchange can enter the non-member entity's trading instructions using a customer computer 124. Customer computer 124 may include one or more devices, such as a cellular telephone, smartphone, personal computer, laptop computer, tablet computer, or other mobile or fixed devices now known or later developed. The non-entity entered trading instructions may be routed through a member firm order routing system 126, which may transmit the electronic trading instructions to the member interface 106 (or an API). The trading instructions may be used to purchase one or more financial products whose value is determined using calculation engine 112.

The exchange backend systems 116 may perform a number of functions. For example, exchange backend systems 116 may perform operations related to contract definition and listing data. Additionally, exchange backend systems 116 may perform operations including one or more of (i) transmitting information regarding orders (including, but not limited to orders relating to index-based derivatives) to market data vendors 128; (ii) performing operations related to the performance of financial product upon which derivatives are based; (iii) determining appropriate contract settlement values; (iv) supplying final settlement data to the clearing systems 118 and the member firm backend systems 120; (v) etc.

Figure 2:
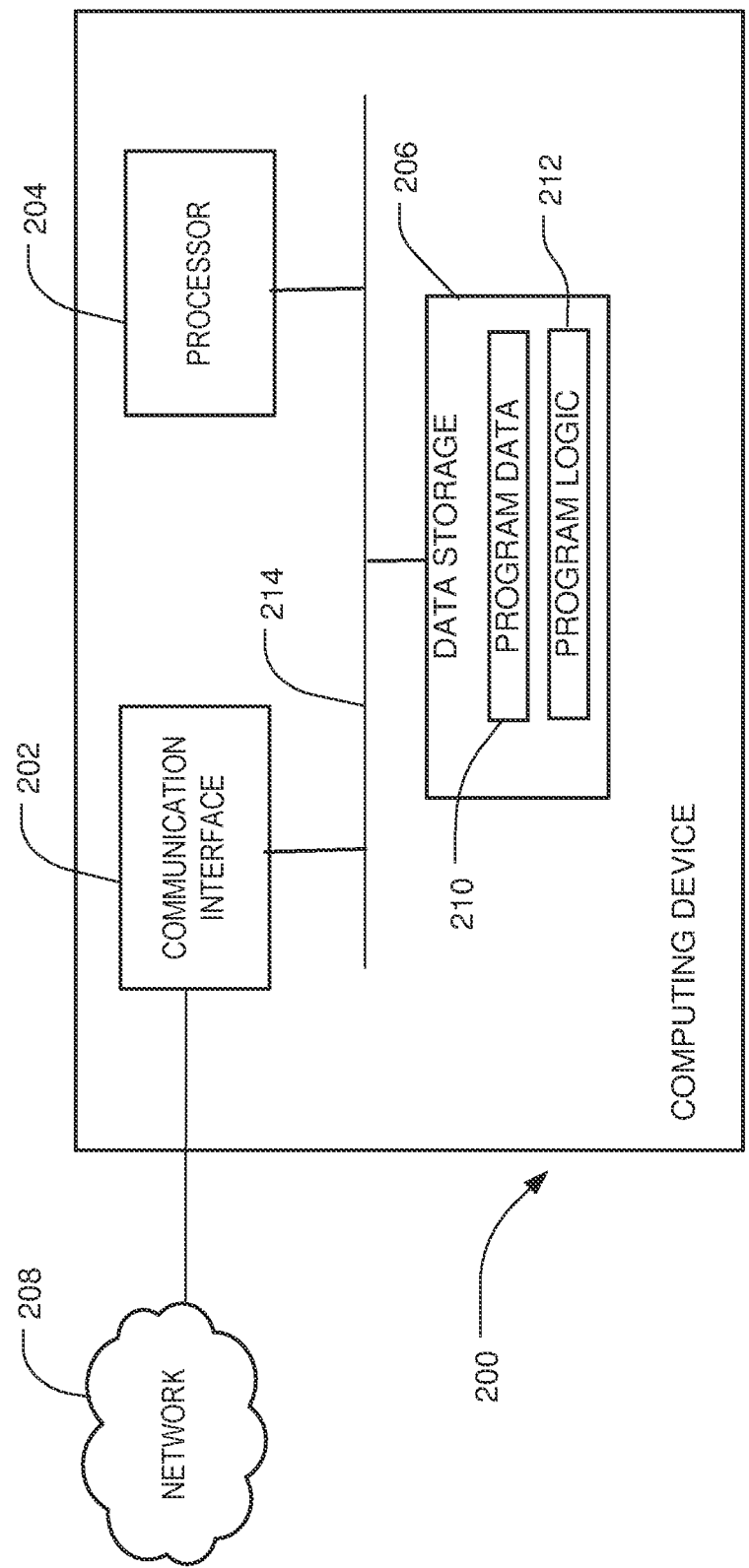
FIG. 2 is an illustrative example of an embodiment of a general computer system usable as one or more than one of the system components of FIG. 1.

FIG. 2 is a functional block diagram that illustrates a computing device 200 used in a trading platform 104 or exchange backend systems 116 such as illustrated in FIG. 1 in accordance with embodiments described herein. Computing device 200 may take a variety of forms. For example, computing device 200 may comprise or be arranged as a server, a computer, or other device or processing component that is now known or later developed, configured using proprietary software designed and implemented to achieve the functionality described herein.

As shown, computing device 200 may include a communication interface 202, a processor 204, and a data storage 206, all of which may be communicatively linked together by a system bus, network, or one or more other connection mechanisms 214. Although not shown, computing device 200 may also include other components, such as external storage, an input device operative to interact with the computing device, etc. It should also be understood that the configuration or functionality of computing device 200 may be distributed or subdivided between a plurality of entities, such as multiple computing devices. Further, it should be understood that some of the functions described herein may be carried out by an entity other than computing device 200.

In computing device 200, the communication interface 202 may comprise one or more structures, and associated equipment, for receiving data from one or more sources and distributing data to a group of one or more destinations. Communication interface 202 may be configured to receive input set data from one or more entities (such as matching engine 108 in FIG. 1) and store all or part of the input set data in data storage 206. Communication interface 202 may also be configured to communicate all or part of the input set data to data output engine 114 once the input sets are stored or otherwise processed.

Communication interface 202 may be configured to connect with a network 208, external media, a display, or any other components that may be present in a trading system (such as financial trading system 100 in FIG. 1). The connection with the network 208 (and/or components thereof) may be wired connection, a wireless connection, or combinations thereof. For example, the connection may be a physical connection, such as a wired Ethernet connection or Infiniband connection. In another example, the connection may be a wireless connection, such as a cellular telephone network, an 802.11, 802.16, 802.20 controls or components, a WiMax network, or any other type of network. Further, network 208 may be a public network, such as the Internet, a private network, such as an intranet, or combinations thereof, and may utilize a variety of networking protocols now available or later developed including, but not limited to TCP/IP based networking protocols.

Processor 204 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. Processor 204 may carry out one or more instructions using one or more arithmetic, logical, and/or input/output operations. Though processor 204 is illustrated as a single component, processor 204 may be integrated in whole or in part with other components of computing device 200.

Data storage 206 may be a main memory, a static memory, or a dynamic memory. Data storage 206 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. In one case, data storage 206 may include a cache or random access memory for the processor 204. Data storage 206 may be separate from the processor 204, such as a cache memory of a processor, the system memory, or other memory. Data storage 206 may be an external storage device or database for storing data. Examples may include a hard drive, compact disc ("CD"), digital video disc ("DVD"), memory card, memory stick, universal serial bus ("USB") memory device, or any other device operative to store data.

As further shown, data storage 206 may include program data 210 and/or program logic 212. Program data 210 may include one or more types of data suitable for a given implementation. For example, program data 210 may include data (such as input sets) that may be stored in memory. Program logic 212 may include, for example, machine language instructions executable by processor 204 to carry out various functions, such as the functionality of the methods and systems described herein. In some examples, the functions, acts or tasks may be independent of the particular type of instructions sets, storage media, processor or processing strategy and may be performed by software, hardware, integrated circuits, firm-ware, microcode and the like, operating alone or in combination. Processing strategies may include multiprocessing, multitasking, parallel processing and the like.

Figure 3:
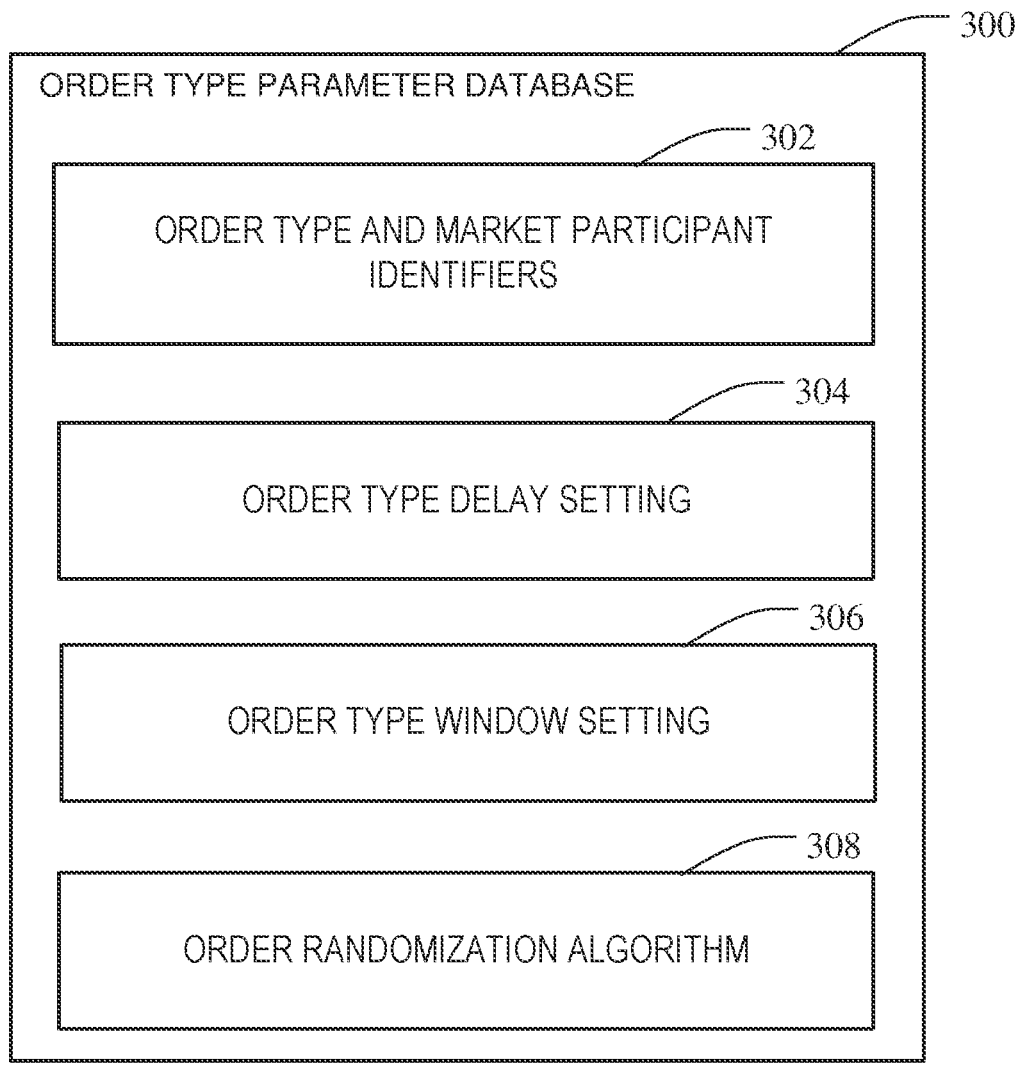
FIG. 3 illustrates an example of a financial exchange order type parameter database for use in the system of FIG. 1

Referring now to FIG. 3, the trading platform 104 may use identifiers for labeling order types, message types and market participants, as well as predetermined parameters or algorithms to identify each order type and the delay that may be appropriate for adding to processing of the order type or orders from a particular market participant. These identifiers and parameters may be stored in the trading platform 104 in an order type parameter database 300. The order type parameter database 300 may include the parameters that the trading platform 104 updates and utilizes for determining which market participant is sending a message, and the time of day and order type that may trigger a latency adjustment to maintain an orderly market. For example, the quote order type database 300 may include order type and market participant identifiers 302 that uniquely identify the origin of an order or other message, as well as the order type contained in a message or relating to the message. The order type parameter database 300 may also include an order type delay setting 304 identifying a length of time that a quote or order of a predetermined type may be subjected to a delay if a time of trading day or other triggering parameter is met. Additionally, an order type window parameter 306, identifying the time of day or the algorithm used for identifying when to begin the delay for a particular order type, may be included in the database 300. The order type parameter database may also include one or more order randomization algorithms 308 for reordering received orders of a given order type in a randomized fashion. The randomization algorithms, order randomization start/stop times for order randomization, and delay requirements may also be included in the order type parameter database. The order type parameter database 300 may be stored in one or more locations in the exchange systems 102, for example the trading platform 104, such as in the latency adjuster 111, the matching engine 108 or other component in the trading platform having a memory.

Figure 4:
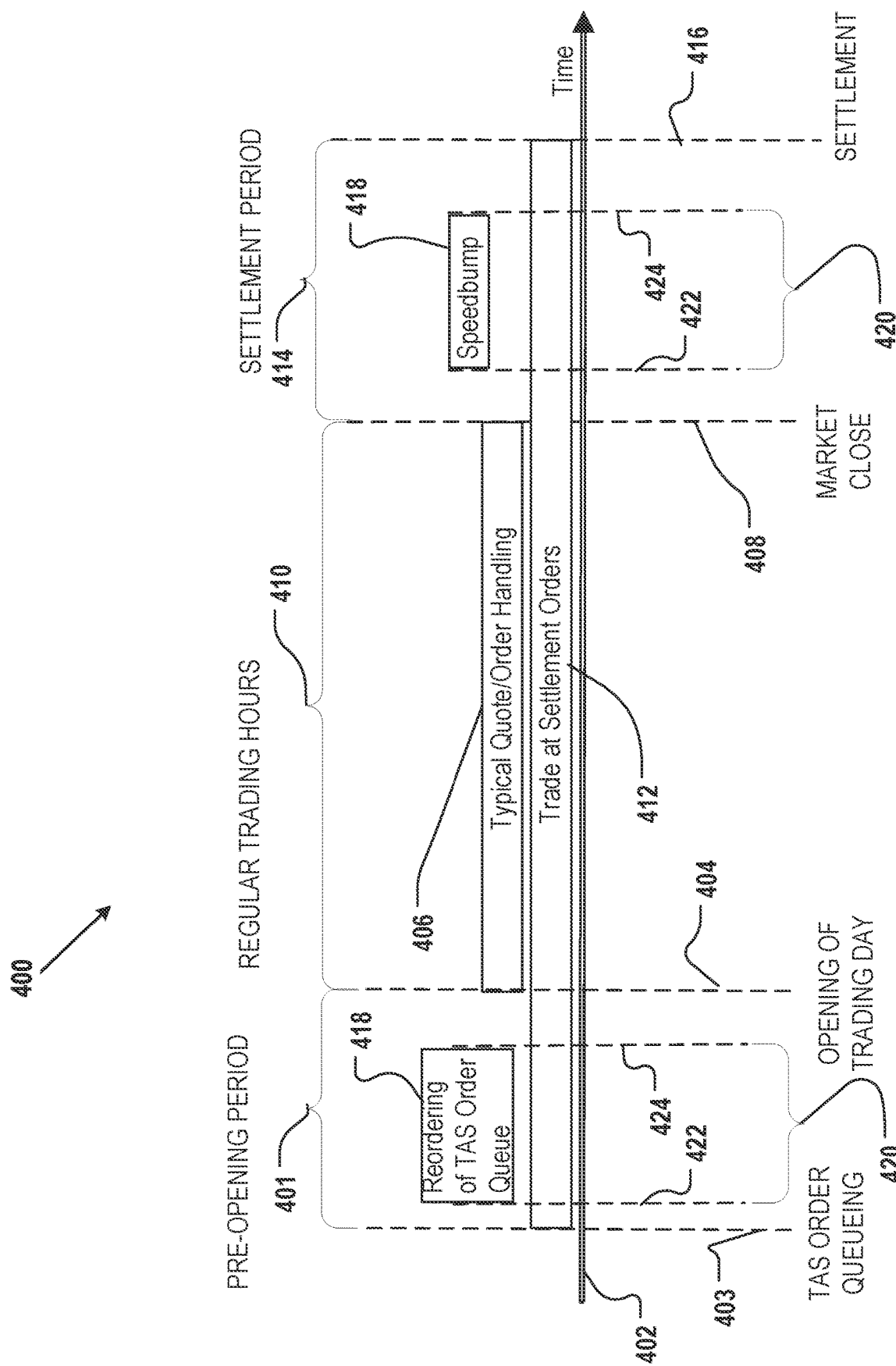
FIG. 4 is a timeline illustrating a trading day at the financial trading system of FIG. 1 and showing an example of order reordering and an optional speedbump added to a particular order type during a settlement period of the trading day.

Utilizing the components of FIGS. 1-3, a method of applying a re-ordering of orders or order messaging in an order-type specific queue, and/or adding a messaging delay based on order type, is illustrated in FIG. 4. FIG. 4 illustrates an example trading session 400 with certain landmark times of the trading session 400 shown along a timeline 402. A pre-opening period 401 may be set before the opening of the exchange where TAS order queueing starts 403 and proceeds until the opening of the trading day 404. In one implementation, specific order types, like TAS orders, received during the pre-opening period 401 of the trading day, may be re-ordered from the actual time of receipt to a modified priority ordering. In other implementations, a specific order type may have a latency delay added to it separately from, or in addition to, the re-ordering of the received order queue for that order type.

At the opening 404 of the trading day for a variety of order types 406 on the electronic exchange quotes and orders are managed for many different order types and the orders are accepted and matched up to the market close 408 at the end of the regular trading hours 410 for the electronic exchange.

Certain order types, for example the trade at settlement (TAS) orders 412, may be able to be submitted, modified, or cancelled into the pre-opening period 401 through the settlement period 414 after the market close 408 up until the final settlement 416 time. Because a TAS order 412 is one that does not have its price decided until settlement 408, there may be a burst of quotes and orders during the settlement period 414 that market participants may use to engineer a last moment change, such as a cancellation of an order or a change in pricing. Although rapid submission of orders and cancellations for TAS orders may take place at the end of the trading day after market close 408, the initial pre-opening period 401 is often where an exchange may see a race for queueing priority of the TAS orders where those market participants with better technology or understanding of the technical order processing capabilities of the exchange may inadvertently obtain, or purposely employ, a technology advantage. Thus, the queueing of TAS orders 403 in the pre-opening period 401 may be unrelated to orderly market conditions and, instead, may be related to technological advantages of the trading systems of technologically advantaged market participants over the trading systems of other market participants. With higher speed computing systems that are technically superior in the speed in which order messages (and order cancellation messages) may be sent to and acted on by the electronic exchange, a market participant may become a predatory market participant with respect to TAS orders by taking advantage of faster technology at opening to obtain TAS order queue advantage and then send the trading platform 104 quick cancellations in the brief settlement period 414 to obtain a best price after market close 408 where the final prices are determined. The problematic trading activity that may be more readily initiated by more technologically advantaged market participants may be accomplished by posting orders at different price levels during the pre-opening period 401 and then quickly removing selective quotes and orders before settlement 416. This rapid, last moment order activity can force the TAS orders awaiting execution on the electronic trading system to trade at an undesirable price, or force market participants interested in TAS orders to settle for selecting a less desirable price range when entering a TAS order earlier in regular trading hours 410 or the settlement period 414. This type of predatory market participant activity may even shut out other market participants from matching with any contra TAS orders at all due to the technical advantage the trading systems of certain technologically advantaged market participants may have to affect changes both at pre-opening during order queueing and in the short time of the settlement period 414.

As a way of reducing the technical advantage certain market participants may have during the pre-opening period 401 and settlement period 414, an automated and randomized reordering of the TAS order queue during pre-opening 401, with or without an automated speedbump 418 during settlement, may be generated by the latency adjuster 111 for certain trading activity relating to TAS orders. As shown in FIG. 4, the optional speedbump 418 has a time duration 420, a start time 422 and a stop time 424. In one implementation, the duration 420 of the speedbump 418 may be a fixed time, for example 5 milliseconds or a fixed percentage of the total settlement period 414. In this fixed duration embodiment, the start time 422 may be randomized by the latency adjuster 111. For example, the start time 422 may begin at any point in the queueing period, or may begin at a random time only within a predetermined window of time beginning at the market close 408. In an alternative implementation, the both the duration 420 and the start time 422 may be fixed.

In another embodiment, the start time 422 of the speedbump 418 may be fixed, for example at market close 408, while the speedbump duration 420 is randomly selected each day by the latency adjuster 111. The randomly selected duration 420 may be completely random, or be selected within a window duration of, for example, 10 microseconds to 5 milliseconds. In yet another implementation, both the duration 420 and start time 422 may be fixed and the stop time 424 of the speedbump 418 maybe random. Also, in yet another embodiment, both the duration and the start/stop times 422, 424 may be randomly selected each day. In one implementation, the start time delay is before market open but after the pre-open queuing period begins Alternatively, rather than (or in conjunction with) imposing a speedbump 418 during the settlement period 418, the speedbump 418 may be applied to TAS orders sent in during the pre-opening period 401 in any of the same ways discussed herein with respect to the settlement period speedbump option.

Figure 5:
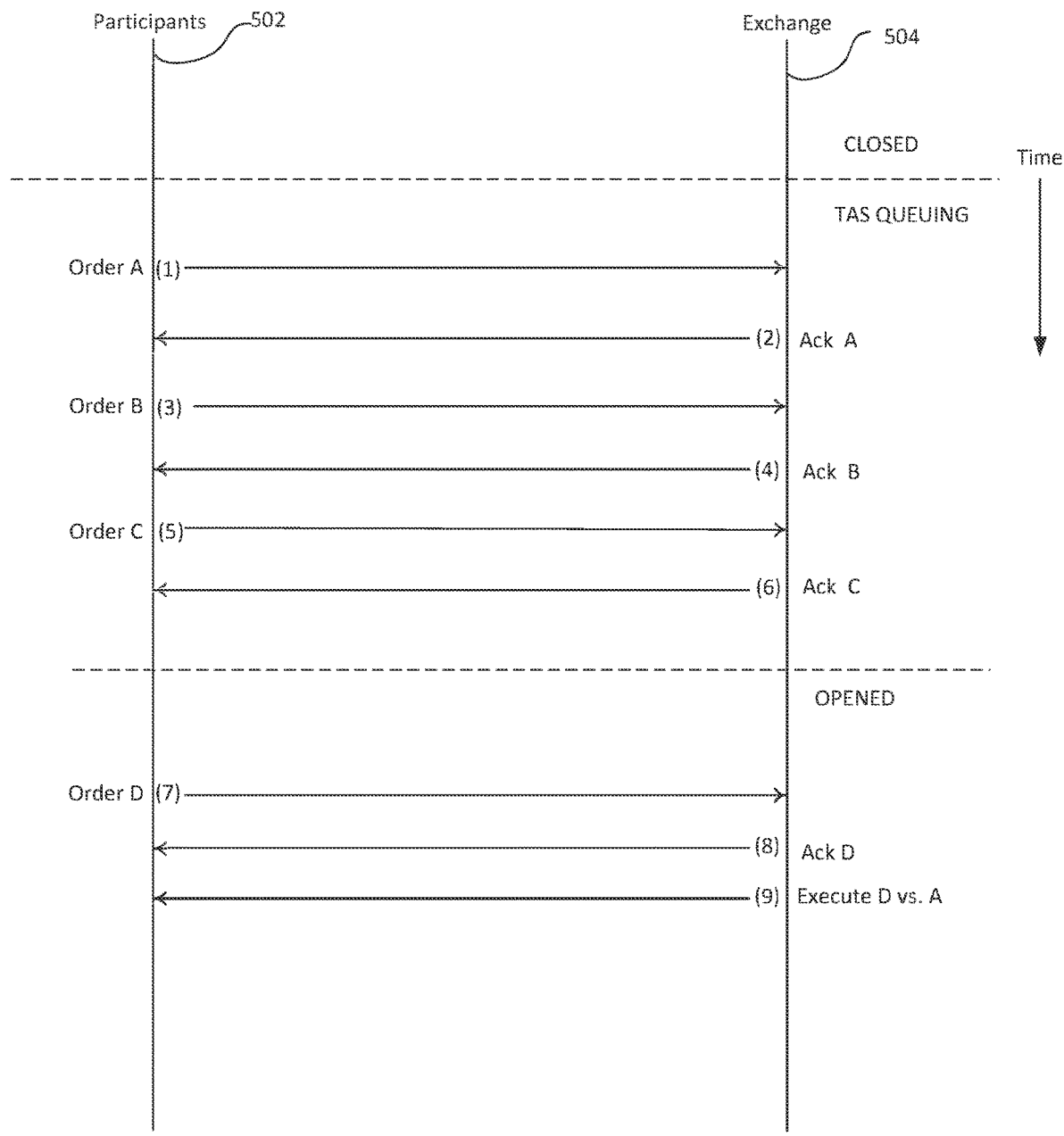
FIG. 5 is an illustration of incoming orders at an exchange having a typical time-order priority of acknowledging and queueing received orders.

FIG. 5 illustrates a typical order of events in an exchange that is not implementing the features described in FIG. 4. The exchange of messages between the market participant 502 and the exchange system 504 over time from the pre-opening period between the beginning of TAS queueing to the opening of the trading day, shows a simple first-in-first-out queueing and execution of orders. For example, if Orders A, B and C are all received during the pre-opening period, they are typically acknowledged and queued up by order of receipt. When the market opens, assuming that orders A, B and C are all the same side order (e.g., all are buy orders) then the matching engine will execute a trade of the first received order (here, Order A) against the first received contra order (Order D) that arrived and was acknowledged after the market opened.

Figure 6:
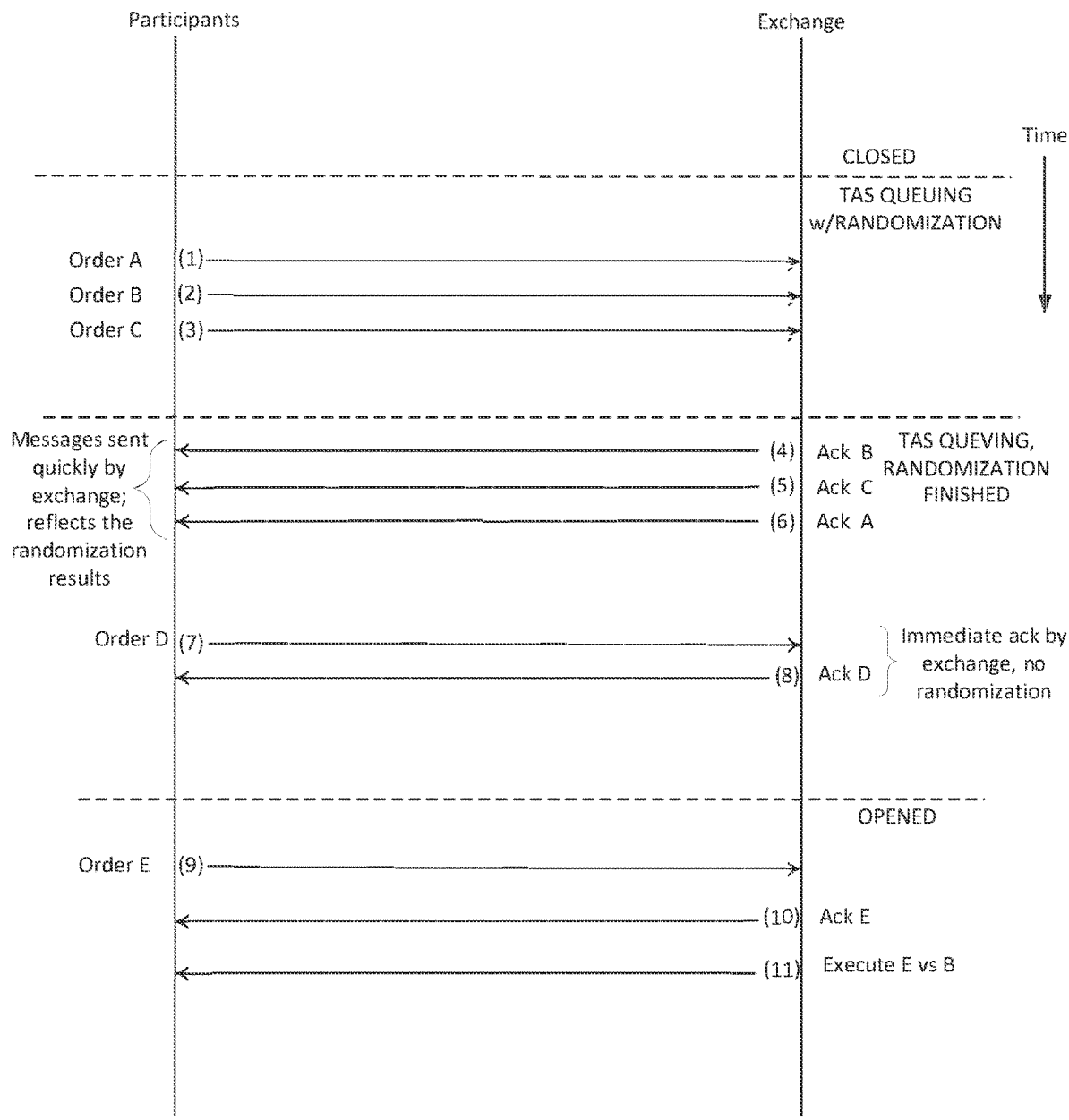
FIG. 6 illustrates one example of implementing re-ordering a queue of received orders of a specific order type during the pre-opening period shown in FIG. 4.

The example of FIG. 6 illustrates an order flow in an exchange system having one of the features discussed with respect to FIG. 4. Specifically, FIG. 6 demonstrates a simplified version of order flow where TAS orders received during the TAS queueing are reordered during pre-opening period. The pre-opening period includes a randomization or re-ordering portion and a regular pre-opening portion. During the randomization portion or the pre-opening period, the latency adjuster receives and recognizes TAS orders. Rather than immediately acknowledge the order by returning an acknowledgement message indicating timing and priority of the received order, it briefly stores all of the orders received during the randomization period and then reorders their priority at the end to the randomization period. After the end to the randomization portion of the TAS order queueing period, the acknowledgments from the exchange system of these particular orders are then sent out indicating the reordered priorities implemented by the latency adjuster.

As shown in FIG. 6, the sequential orders from market participants (Orders A, B and C) received during the randomization portion of the pre-opening period are randomized and acknowledged in a different order (Ack B, C and A, indicating the new randomized priority from the original A, B, C order of receipt) during the remainder of the pre-opening period. Accordingly, only a small delay in the acknowledgement of the orders received and randomized during the randomization portion of the pre-opening period occurs. Also, any TAS orders received during the remainder of the pre-opening period are not randomized or delayed and are simply queued in the order received, as indicated by the Order D sent by a market participant, and immediately acknowledged by the exchange system as having a time priority based on the order of receipt.

Subsequently, after the market opens, the first contra order to the earlier received orders will trade against the order given the first priority in the randomization portion of the pre-opening period. Assuming in the simplified example of FIG. 6 that all of the TAS orders received in the pre-ordering period were of the same type (e.g. sell orders), and that the first contra order (e.g. buy order) received after the market open is Order E, then the matching engine of the exchange system would execute Order B against Order E. In like manner, the next buy order arriving would be executed against Order C due to the randomization that had been applied earlier to the TAS order queue.

The re-ordering of the TAS order priorities from the actual time of receipt priority may be accomplished by the latency adjuster 111 in several ways. The latency adjuster may retrieve an order randomization algorithm 308 from the order type parameter database 300. That order randomization algorithm may be a random number generator that assigns a new priority value to each order, or simply a fixed technique of shuffling order priority by, for example, executing a one-time swap of the queue order of each pair of received TAS orders with the next later order in the queue (e.g. re-ordering 1,2,3,4,5,6 to 2,1,4,3,6,5). Any number of randomization algorithms or of predetermined fixed techniques may be used, and a different technique or randomization algorithm, from a set of different fixed techniques or randomization algorithms may be selected for use on a given trading day.

Figure 7:
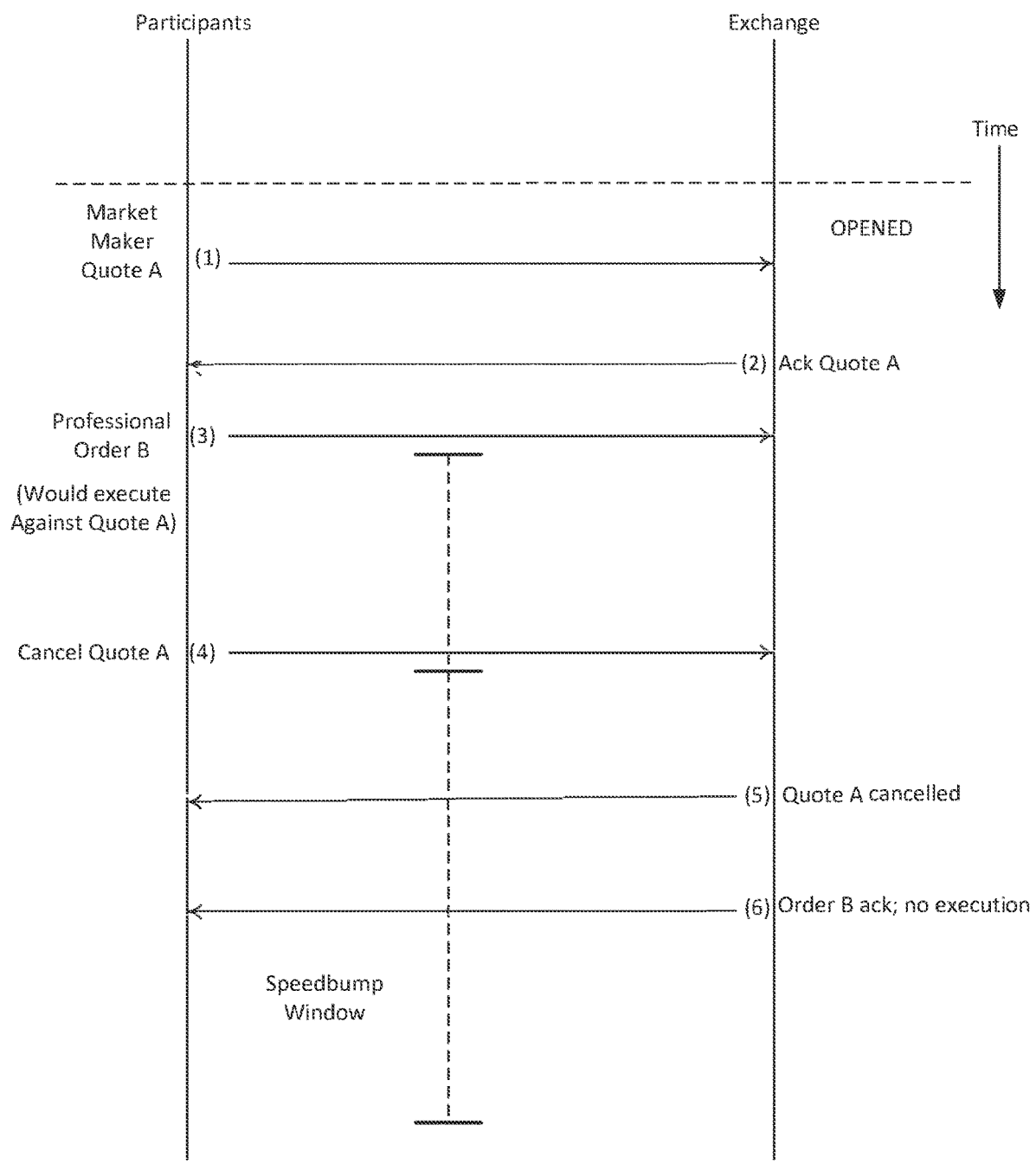
FIG. 7 illustrates one example of implementing a speedbump based on order type that may be used with the re-ordering technique of that order type illustrated in FIG. 6.

In one alternative implementation, as illustrated in the example of FIG. 7, a speedbump may be applied to prevent a market participant having a technological advantage from lifting a TAS quote from a market maker. The latency adjuster 111 may identify a market maker TAS quote and, based on identifying that a contra TAS order has arrived that would execute against that order, provide a latency to that contra TAS order so that the market maker quote may have a little more time to cancel the market maker quote. Thus, the market participant order (Professional Order B) would be delayed by a speedbump to allow more time for the market maker cancellation of the original market maker quote to make it to the exchange. The cancellation (Cancel Quote A), which was not subjected to a speedbump would first be acknowledged (Quote A Cancelled), and then the delayed market participant order would be later acknowledged (Order B Ack) and would not execute against the market maker original quote. The window of time in which the speedbump may be applied may be, for example, between 1 microsecond and 10 milliseconds. This time window may be adjusted as the marketplace and technology continues to progress. The speedbump may be selectively applied to market participant orders directed to market maker quotes during this speedbump window, based on the market participant ID associated with the quote or order and based on the order type identifier (e.g. a TAS order).

Figure 8:
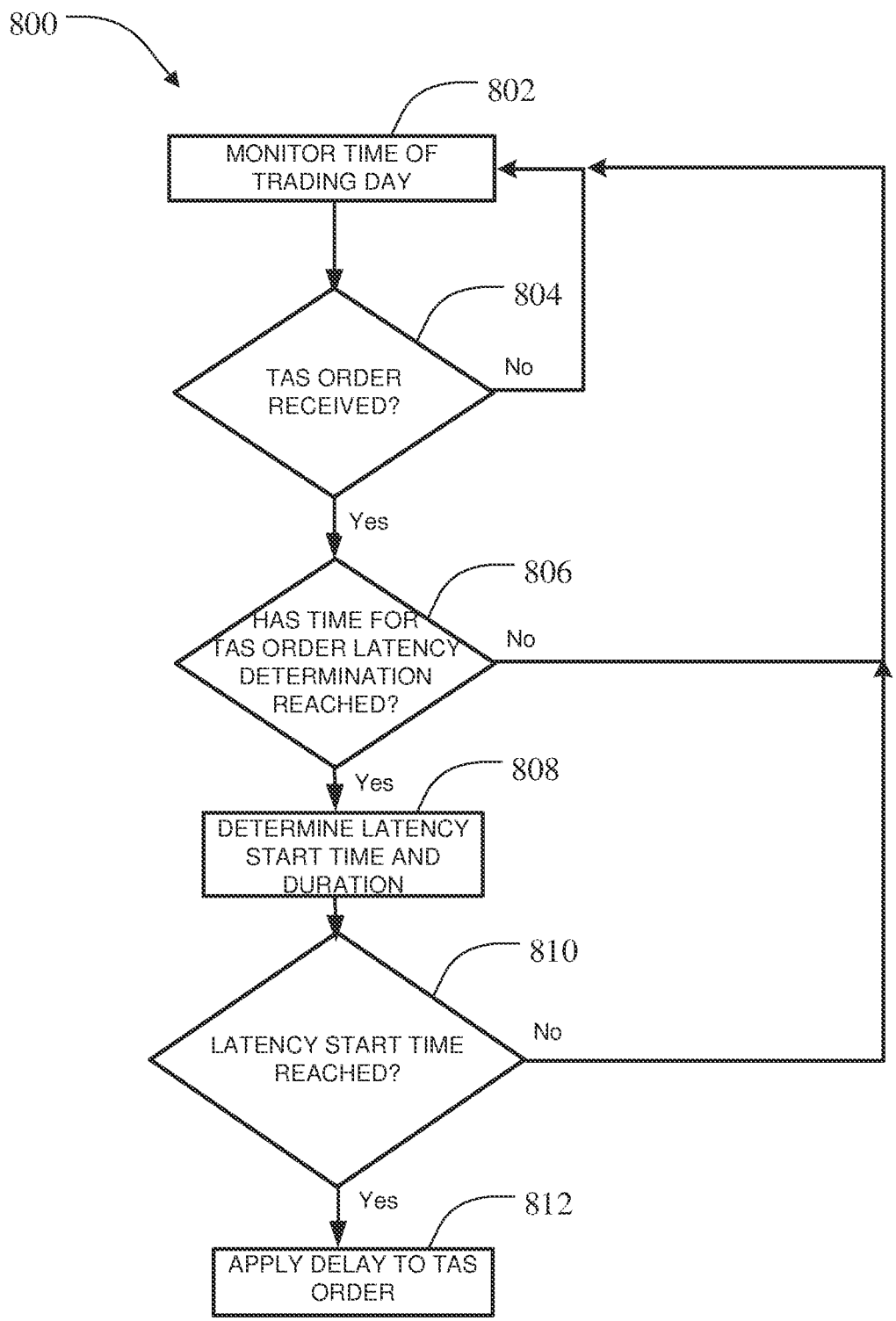
FIG. 8 is one implementation of a logic flow that a financial trading system may implement to perform message latency adjustment for a trade at settlement order.

FIG. 8 illustrates an example decision flow that may be executed by the trading platform 104, for example by a processor of the latency adjuster 111, for monitoring trade activity and instituting latency to order execution and/or message transmission. In the discussion above, a particular order type, the TAS order, is discussed for applying re-ordering of an order queue during pre-opening, or order latency, however other order types are also contemplated. Referring to FIG. 8, one example of a process 800 for applying a speedbump to particular order types is illustrated. The latency adjuster 111 of the exchange systems 102 monitors the time of the trading day to determine if the time for a potential speedbump generation operation is appropriate (at 802). If an order is received (at 804) and if order type is not of the type that the speedbump would be generated for (e.g. other than a TAS order in this embodiment), then the latency adjuster 111 takes no action, regardless of the time of the trading day. If the incoming order is identified as the correct order type, a TAS order in this embodiment, then the latency adjuster takes a next step in determining whether to apply a speedbump. The determination of order type for an incoming order may be based on an identifier associated with the order type that may be included or added to an order that is received at the member interface 106 of the trading platform 104. The latency adjuster 111, which maybe in the member interface 106, the matching engine 108 or other portion of the trading platform 104, may then identify whether the order type associated with the received message or order matches one in the order type parameter database 300 associated with any latency requirement or rules.

The process 800 continues with, when the received order type is the TAS or other predetermined order type, determining whether the time for determining what the latency should be for newly incoming orders and messages identified as TAS related (at 806). In one implementation, this may be a determination as to whether the market close 408 has been reached. Alternatively, other parameters may be considered that moves the time for latency determination before the close 408 or bypasses the latency process altogether in other implementations.

When a TAS order latency determination time has been reached, the latency adjuster 111 calculates the duration 420 of the speedbump 418 that will be applied, as well as the start 422 or stop 424 time of the speedbump 418 (at 806, 808). As noted above, the order type parameter database 300 may be accessed by the latency adjuster 111 to obtain the actual values or algorithms for calculating the delay duration and the start or stop times. For example, the duration of the speedbump 418 may be from a fixed number, or a table of fixed numbers, in the order type delay setting 304 region of the order type parameter database. The start and stop time may be randomly generated using a random number generator algorithm contained in the order type window setting 306 of the database 300. The random number generation algorithm could be seeded with a current time measurement from a processor clock used by a processor of the latency adjuster in embodiment.

In different implementations, the duration and start/stop times of the speedbump may be further adjusted by market participant specific characteristics based on a market participant identification code, IP address or other market participant identifier associated with a TAS related message. In this manner, the particular known technology advantage of a given market participant, or a pattern of that market participant's prior trade actions indicative of a technology advantage, may be further compensated for in the TAS order delay process by increasing the window or duration of the speedbump applied to their particular order processing.

After determining the duration and start/stop times of the speedbump for a given TAS-related order received, the latency adjuster waits until the determined start time 422 has been reached for that TAS order speedbump 418 and then applies the calculated speedbump to delay processing of that order for the determined duration 420 (at 810, 812). In one embodiment, the same speedbump 418 (duration) is applied to all TAS order processing from any market participant during the settlement period up to the settlement time. In other implementations, such as noted in the example of FIG. 7, only certain market participant TAS orders, or orders directed against an existing TAS quote from a market maker are subjected to a speedbump.

A system and method for re-ordering received orders of a specific order type during a pre-opening period, and/or managing latency of messages in an electronic exchange is described above. To maintain an orderly and efficient electronic marketplace, and counteract potential high frequency or predatory market practices available to those market participants with technology advantages over others, a re-ordering of queue priority or a latency may be applied to processing of certain order types based on time of trading day. The queue reordering, latency duration, or application start/stop time for the particular order type may be fixed or random.

It is intended that the foregoing detailed description be regarded as illustrative rather than limiting, and that it be understood that it is the following claims, including all equivalents, that are intended to define the spirit and scope of this invention.

We claim:

1. A computer-implemented method adjusting order queue priority in an electronic exchange system, the method comprising:
   in a processor of the electronic exchange system:
      receiving an electronic order message from a market participant;
      identifying, based on an automated comparison of message header data in the electronic order message with an order type database, which order type of a plurality of order types is associated with the received electronic order message;
      when the order type is identified as a trade at settlement (TAS) order:
         determining if the TAS order has been received during a designated time period for order randomization; and
         only when the TAS order has been received during the designated time period:
            delaying acknowledgement of the TAS order;
            continuing to receive and delay acknowledgement of additional TAS orders until an end of the designated time period has been reached; and
            at the end of the designated time period, re-ordering a time priority of TAS orders received during the designated time period and transmitting an acknowledgment for each of the TAS orders received during the designated time period according to the re-ordered time priority.

2. The computer-implemented method of claim 1, wherein identifying the order type of the received electronic order message comprises comparing an order type identifier associated with the received electronic order message to an order type database.

3. The computer-implemented method of claim 1, wherein the re-ordering a time priority of the TAS orders is based on the order type.

4. The computer-implemented method of claim 1, wherein the re-ordering a time priority of the TAS orders is based on the market participant.

5. The computer-implemented method of claim 1, wherein the re-ordering a time priority of the TAS orders is a fixed randomization process based on a pre-determined re-ordering technique.

6. The computer-implemented method of claim 1, wherein the re-ordering a time priority of the TAS orders is randomized based a random selection of a re-ordering technique.

7. The computer-implemented method of claim 1, further comprising:
   retrieving an order randomization algorithm from an order type database, and;
   wherein the re-ordering a time priority of the TAS orders is based on the retrieved order randomization algorithm.

8. The computer-implemented method of claim 1, wherein the re-ordering a time priority of the TAS orders is randomized based a random number generator.

9. The computer-implemented method of claim 1, wherein the processor is located in a member interface of a trading platform in the electronic exchange system.

10. The computer-implemented method of claim 1, wherein the processor is located in a matching engine of a trading platform in the electronic exchange system.

11. The computer-implemented method of claim 1, wherein a duration of the designated time period is retrieved from an order type database.

12. An electronic exchange system for adjusting order queue priority, the electronic exchange system comprising:
   a communication interface configured to identify an order type associated with an electronic order message;
   a processor in communication with the communication interface;
   a memory comprising process-executable instructions that when executed by the processor cause the processor to:
      receive the electronic order message from a market participant;
      identify, based on an automated comparison of message header data in the electronic order message with an order type database, which order type of a plurality of order types is associated with the received electronic order message;
      when the order type is identified as a trade at settlement (TAS) order:
         determine if the TAS order has been received during a designated time period for order randomization; and
         only when the TAS order has been received during the designated time period:
            delay acknowledgement of the TAS order;
            continue to receive and delay acknowledgement of additional TAS orders until an end of the designated time period has been reached; and
            at the end of the designated time period, re-order a time priority of TAS orders received during the designated time period and transmitting an acknowledgment for each of the TAS orders received during the designated time period according to the re-ordered time priority.

13. The electronic exchange system of claim 12, wherein identifying the order type of the received electronic order message comprises comparing an order type identifier associated with the received electronic order message to an order type database.

14. The electronic exchange system of claim 12, wherein the re-ordering a time priority of the TAS orders is based on the order type.

15. The electronic exchange system of claim 12, wherein the re-ordering a time priority of the TAS orders is based on the market participant.

16. The electronic exchange system of claim 12, wherein the re-ordering a time priority of the TAS orders is a fixed randomization process based on a pre-determined re-ordering technique.

17. The electronic exchange system of claim 12, wherein the re-ordering a time priority of the TAS orders is randomized based a random selection of a re-ordering technique.

18. The electronic exchange system of claim 12, further comprising:
   retrieving an order randomization algorithm from an order type database, and;
   wherein the re-ordering a time priority of the TAS orders is based on the retrieved order randomization algorithm.

19. The electronic exchange system of claim 12, wherein the processor is located in a member interface of a trading platform in the electronic exchange system.

20. The electronic exchange system of claim 12, wherein the processor is located in a matching engine of a trading platform in the electronic exchange system.

* * * * *